United States Patent
Zhao

(10) Patent No.: US 10,506,400 B2
(45) Date of Patent: Dec. 10, 2019

(54) DATA DOWNLOAD METHOD AND APPARATUS

(71) Applicant: Tencent Technology (Shenzhen) Company Limited, Shenzhen (CN)

(72) Inventor: Anyuan Zhao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 131 days.

(21) Appl. No.: 15/721,875

(22) Filed: Sep. 30, 2017

(65) Prior Publication Data

US 2018/0027355 A1 Jan. 25, 2018

Related U.S. Application Data

(63) Continuation-in-part of application No. PCT/CN2016/104189, filed on Nov. 1, 2016.

(30) Foreign Application Priority Data

Nov. 17, 2015 (CN) .......................... 2015 1 0791455

(51) Int. Cl.
*H04W 4/60* (2018.01)
*H04W 4/50* (2018.01)
(Continued)

(52) U.S. Cl.
CPC .......... *H04W 4/60* (2018.02); *G06F 16/9566* (2019.01); *H04L 67/025* (2013.01); *H04L 67/06* (2013.01);
(Continued)

(58) Field of Classification Search
CPC ....... H04W 4/60; H04W 4/50; G06F 16/9566; H04L 67/06; H04L 67/025; H04L 67/34; H04L 67/42; H04L 67/125
See application file for complete search history.

(56) References Cited

U.S. PATENT DOCUMENTS

2006/0129628 A1* 6/2006 Kamiya ................ G06F 9/468
709/203
2011/0066999 A1* 3/2011 Rabinovich .............. G06F 8/51
717/104
(Continued)

FOREIGN PATENT DOCUMENTS

CN 102571899 A 7/2012
CN 102970346 A 3/2013
(Continued)

OTHER PUBLICATIONS

Tencent Technology, ISRWO, PCT/CN2016/104189, dated Jan. 24, 2017, 6 pgs.
(Continued)

*Primary Examiner* — Michael A Keller
(74) *Attorney, Agent, or Firm* — Morgan, Lewis & Bockius LLP

(57) ABSTRACT

This application discloses a data download method performed at a computing device having one or more processors and memory storing one or more programs to be executed by the one or more processors, the method comprising: obtaining a download task from a user of the computing device; generating a uniform resource identifier (URI) based on a download address that is in the download task; and invoking a system standard access interface to transmit the URI to a system browser, wherein the system browser is configured to add the download address that is in the received URI to a data download queue.

16 Claims, 2 Drawing Sheets

---

S10 — Obtain a download task, and generate a uniform resource identifier URI based on a download address that is in the download task S20 — Invoke a system standard access interface to transmit the URI to a system browser, the system browser adding the download address that is in the received URI to a download queue

(51) Int. Cl.
  *H04L 29/08*   (2006.01)
  *H04L 29/06*   (2006.01)
  *G06F 16/955*  (2019.01)

(52) U.S. Cl.
  CPC ............ *H04L 67/125* (2013.01); *H04L 67/34* (2013.01); *H04L 67/42* (2013.01); *H04W 4/50* (2018.02)

(56) References Cited

U.S. PATENT DOCUMENTS

| | | | | |
|---|---|---|---|---|
| 2011/0078243 | A1* | 3/2011 | Carpenter | G06F 17/246 |
| | | | | 709/204 |
| 2013/0060918 | A1* | 3/2013 | Butler | H04L 67/025 |
| | | | | 709/220 |
| 2013/0227683 | A1* | 8/2013 | Bettini | G06F 21/57 |
| | | | | 726/22 |
| 2016/0132311 | A1* | 5/2016 | Beckman | G06F 8/656 |
| | | | | 717/177 |

FOREIGN PATENT DOCUMENTS

| | | |
|---|---|---|
| CN | 102984364 A | 3/2013 |
| CN | 104462400 A | 3/2015 |
| EP | 1246428 A2 | 10/2002 |

OTHER PUBLICATIONS

Tencent Technology, IPRP, PCT/CN2016/104189, dated May 22, 2018, 5 pgs.

* cited by examiner

DATA DOWNLOAD METHOD AND APPARATUS

RELATED APPLICATIONS

This application is a continuation-in-part application of PCT/CN2016/104189, entitled "METHOD AND DEVICE FOR DOWNLOADING DATA" filed on Nov. 1, 2016, which claims priority to Chinese Patent Application No. 201510791455.4, filed with the State Intellectual Property Office of the People's Republic of China on Nov. 17, 2015, and entitled "DATA DOWNLOAD METHOD AND APPARATUS", both of which are incorporated herein by reference in their entirety.

FIELD OF THE TECHNOLOGY

This application relates to the field of Internet technologies, and in particular, to a data download method and apparatus.

BACKGROUND OF THE DISCLOSURE

When using an application (APP), a user usually needs to update the APP or download some data that is on an interface of the APP. In an existing APP, a download process is usually implemented by invoking a system download thread by a configured application programming interface (API), so that during development of the APP, a software development kit (SDK) needs to be integrated for the APP to implement configuration of the API, leading to high APP development costs.

SUMMARY

Embodiments of this application provide a data download method and apparatus, so as to reduce APP development costs.

To implement the foregoing objective, an embodiment of this application provides a data download method performed at a computing device having one or more processors and memory storing one or more programs to be executed by the one or more processors, the method comprising:

obtaining a download task from a user of the computing device;

generating a uniform resource identifier (URI) based on a download address that is in the download task; and invoking a system standard access interface to transmit the URI to a system browser, wherein the system browser is configured to add the download address that is in the received URI to a data download queue.

To implement the foregoing objective, an embodiment of this application further provides a computing device having at least one processor, memory and one or more program instructions stored in the memory that, when executed by the at least one processor, cause the computing device to perform the aforementioned method.

To implement the foregoing objective, an embodiment of this application further provides a non-volatile computer storage medium storing a plurality of program instructions that, when executed by one or more processors of a computing device, cause the computing device to perform the aforementioned method.

DESCRIPTION OF EMBODIMENTS

The embodiments of this application is a data download method performed at a computing device having one or more processors and memory storing one or more programs to be executed by the one or more processors, the method comprising: obtaining a download task, and generating a uniform resource identifier (URI) based on a download address that is in the download task; and invoking a system standard access interface to transmit the URI to a system browser, wherein the system browser is configured to add the download address that is in the received URI to a data download queue.

In an existing APP, a download process is usually implemented by invoking a system download thread by a configured API, so that during development of the APP, an SDK needs to be integrated for the APP to implement configuration of the API, leading to high APP development costs.

Figure 1:
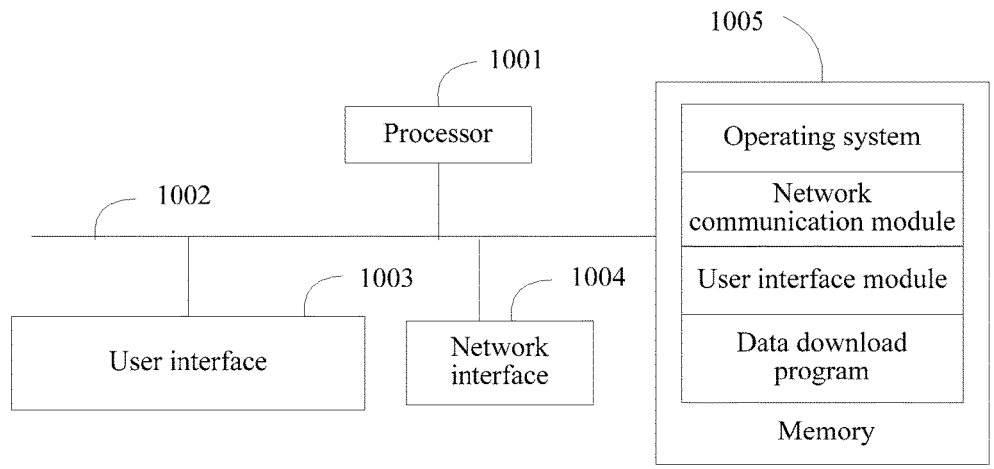
FIG. 1 is a schematic diagram of a hardware architecture of a computing device according to an embodiment of this application.

Specifically, in hardware that is related to a computing device shown in FIG. 1, a network interface 1004 is mainly connected to a server or another network terminal for data transmission. The computing device may be a smartphone or a tablet computer running on Android or IOS. A user interface 1003 is mainly configured to support a user of the computing device to perform data communication with the client and receive information and an instruction entered by the user. The system browser may be a web browser provided as part of the package of the Android and iOS. In addition, the user may install many applications developed by third-party developers, not by the system developers. A processor 1001 may be configured to invoke a data download program stored in a memory 1005, and perform the following operations:

obtaining a download task, and generating a uniform resource identifier (URI) based on a download address that is in the download task; and invoking a system standard access interface to transmit the URI to a system browser, wherein the system browser is configured to add the download address that is in the received URI to a data download queue.

Further, in an embodiment, the processor 1001 may invoke the data download program stored in the memory 1005 to perform the following operations:

when a download task processing instruction that is triggered based on the stored download task is received, obtaining identifier information that corresponds to the download task processing instruction, the download task processing instruction including a task suspension instruction, a task deletion instruction, and a task restart instruction;

generating a uniform resource identifier (URI) based on a download address that is in the download task, and the identifier information; and invoking the system standard access interface to transmit the URI to the system browser, wherein the system browser is configured to process the download task that is in the download queue according to the download address that is in the URI, and the identifier information.

Further, in an embodiment, the processor 1001 may invoke the data download program stored in the memory 1005 to perform the following operations:

receiving a download task processing instruction, obtaining identifier information that corresponds to the download task processing instruction, the download task processing instruction including a task suspension instruction, a task deletion instruction, and a task restart instruction;

changing identifier information of a flag in the URI that is associated with the download task to the obtained identifier information; and invoking the preset system standard data access interface to transmit the URI whose processing status flag is changed to the system browser, the system browser processing the download task that is in the download queue according to the download address and the flag that are in the URI.

Further, in an embodiment, the processor 1001 may invoke the data download program stored in the memory 1005 to perform the following operations:

receiving response information that is returned by the system browser by using the standard data access interface; and changing a download state of the download task according to the response information.

Further, in an embodiment, the processor 1001 may invoke the data download program stored in the memory 1005 to perform the following operations:

displaying a download progress interface of the system browser.

According to the foregoing solution, in this embodiment, a dedicated API download interface does not need to be configured for an application. During data download, a uniform resource identifier (URI) is directly generated based on a download address that is in the download task, and a unified system standard access interface is invoked to transmit the URI to a system browser. The system browser adds the download address that is in the received URI to a download queue. In this way, the data download is implemented without integrating a SDK for the application, thereby reducing third-party application development costs.

Based on the foregoing hardware architecture, embodiments of a data download method according to this application are provided.

Figure 2:
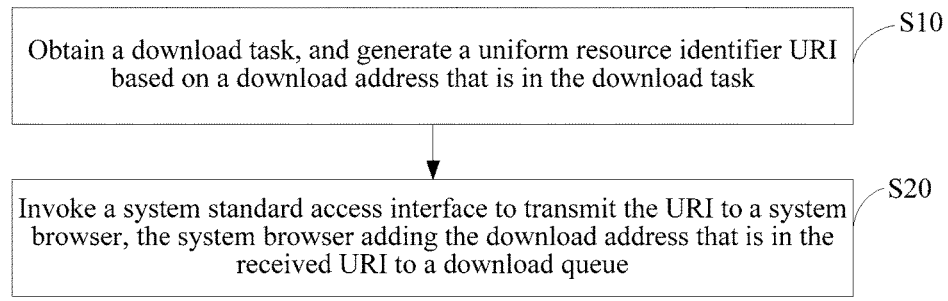
FIG. 2 is a schematic flowchart of a data download method according to an embodiment of this application.

As shown in FIG. 2, an embodiment of the data download method according to this application is provided. The data download method includes:

Operation S10: Obtain a download task, and generate a uniform resource identifier (URI) based on a download address that is in the download task.

In this embodiment, a user may trigger a data download request based on a control on an operating interface of an application, such as an image download control or a song download control, to obtain a corresponding download task. The download task may be data such as an image or a song. A download address for obtaining the data may be a uniform resource identifier (URI) address, e.g., a uniform resource locator (URL).

A URI generation protocol is stored in the application. A URI is generated according to the stored URI generation protocol and based on the download address. The URI allows the user to exchange any resource (including a local resource and an Internet resource) by using a specified protocol. The URI may be stored after being generated, so that the URI can be invoked by the user for a next data download.

Operation S20: Invoke a system standard access interface to transmit the URI to a system browser, wherein the system browser is configured to add the download address that is in the received URI to a data download queue.

The data download method in this embodiment may be operated on an Android system. The system standard access interface is a standard data access interface of the Android system. Each program on the Android system needs to invoke the system standard access interface when being started, to directly transmit a URI by using the system standard access interface when the URI is generated. An underlying application of the program on the Android system directly transmits the URI to a system browser of an application layer (It may be understood that, when receiving data of a URI format, the underlying application directly transmits the received data to the system browser) when the URI is detected by the underlying application. When receiving the URI, the system browser of the application layer adds a download address that is in the URI to a download queue, and invokes a download thread to implement the data download.

In the data download method provided in this embodiment, a dedicated API download interface does not need to be configured for an application. During data download, a uniform resource identifier (URI) is directly generated based on a download address that is in the download task, and a unified system standard access interface is invoked to transmit the URI to a system browser. The system browser adds the download address that is in the received URI to a download queue. In this way, the data download is implemented without integrating a SDK for the application, thereby reducing development costs.

Further, another embodiment of the data download method according to this application is provided based on the foregoing embodiment. In this embodiment, a user may implement an operation such as suspension, deletion, or restart on a download task by changing a flag in a sent URI. That is, while the download task is obtained, a download task identifier and a download address are stored. After operation S20, the data download method further includes the following operations:

receiving a download task processing instruction that is triggered based on the stored download task identifier, obtaining identifier information that corresponds to the download task processing instruction, the download task processing instruction including a task suspension instruction, a task deletion instruction, and a task restart instruction;

generating a uniform resource identifier (URI) based on the download address that is associated with the download task identifier, and the identifier information; and invoking the system standard access interface to transmit the URI to the system browser, wherein the system browser is configured to process the download task that is in the download queue according to the download address that is in the URI, and the identifier information.

The download task identifier may be a keyword of the download data, or may be named by the user. That is, when a data download instruction is received, a download identifier input interface is displayed for entering the download identifier by the user. When the user clicks a control that is of a current download task and that is on an application interface, an interface of the current download task can be displayed. A download task identifier corresponding to each download task is displayed on the interface. The download task identifiers are ranked in a sequence of generation time. After clicking a download task identifier, the user needs to select a processing type (such as deletion, suspension or restart). In this way, a download task processing instruction can be triggered. It may be understood that suspension and restart can be implemented by directly clicking the download task identifier. For example, if a download task corresponding to the task identifier that is clicked by the user is currently in a suspension state, a restart instruction of the download task is triggered. If the download task corresponding to the task identifier that is clicked by the user is currently in a normal download state, a suspension instruction of the download task is triggered. Different identifier information may be set for different processing instructions for ease of recognition by a browser. For example, identifier information corresponding to a suspension task is 1, identifier information corresponding to a deletion task is 2, and identifier information corresponding to a restart task is 3.

It may be understood that a task identifier and a URI may be stored in an associated manner. When a download task processing instruction is received, a flag in the URI is changed. After a uniform resource identifier (URI) is generated based on a download address that is in the download task, the URI and the download task identifier are stored in an associated manner. After operation S20, the data download method further includes the following operations:

receiving a download task processing instruction, obtaining identifier information that corresponds to the download task processing instruction, the download task processing instruction including a task suspension instruction, a task deletion instruction, and a task restart instruction;

changing identifier information of a flag in the URI that is associated with the download task identifier to the obtained identifier information; and invoking the preset system standard data access interface to transmit the URI whose processing status flag is changed to the system browser, the system browser processing the download task that is in the download queue according to the download address and the flag that are in the URI.

In this solution, a URI does not need to be repeatedly generated, and only a flag in the URI needs to be changed, so that operation of this solution is more convenient.

Further, another embodiment of the data download method according to this application is provided based on the foregoing content. In this embodiment, after the URI is transmitted to the system browser by invoking the system standard data access interface, the data download method further includes:

receiving response information that is returned by the system browser by using the standard data access interface; and changing a download state of the download task according to the response information.

After the URI is transmitted to a system underlying application by using the standard data access interface, the underlying application feeds back response information. When the response information returned by the underlying application is detected, a download state of the download task is changed. The download state includes: a download state, a suspension state, a restart state, and a deletion state.

It may be understood that for ease of checking download progress by a user, when a download progress interface of the system browser pops up on the system, the download progress interface may be set above an application interface. That is, after operation S20, a download progress interface of the system browser is displayed, so that the user can learn about a task download status in time.

Figure 3:
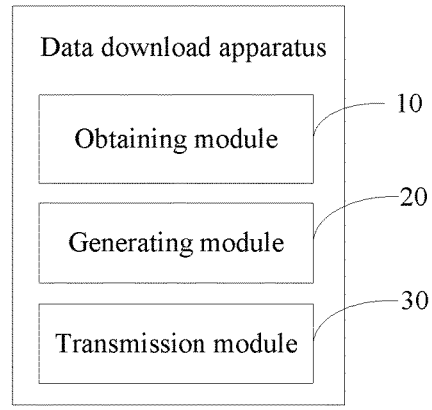
FIG. 3 is a schematic diagram of a functional module of a computing device according to an embodiment of this application.

Correspondingly, an embodiment of a computing device according to this application is provided. Referring to FIG. 3, the computing device includes: an obtaining module 10, a generating module 20, and a transmission module 30.

The obtaining module 10 is configured to obtain a download task.

In this embodiment, a user may trigger a data download request based on a control on an operating interface of an application, such as an image download control or a song download control, to obtain a corresponding download task. The download task may be data such as an image or a song. A download address for obtaining the data may be a URI address.

A URI generation protocol is stored in the application. A URI is generated according to the stored URI generation protocol and based on the download address. The URI allows the user to exchange any resource (including a local resource and an Internet resource) by using a specified protocol. The URI may be stored after being generated, so that the URI can be invoked by the user for a next data download.

The generating module 20 is configured to generate a uniform resource identifier (URI) based on a download address that is in the download task.

The transmission module 30 invokes a system standard access interface to transmit the URI to a system browser, wherein the system browser is configured to add the download address that is in the received URI to a data download queue.

Operation S20: Invoke a system standard access interface to transmit the URI to a system browser, wherein the system browser is configured to add the download address that is in the received URI to a data download queue.

The data download method in this embodiment may be operated on an Android system. The system standard access interface is a standard data access interface of the Android system. Each program on the Android system needs to invoke the system standard access interface when being started, to directly transmit a URI by using the system standard access interface when the URI is generated. An underlying application of the program on the Android system directly transmits the URI to a system browser of an application layer (It may be understood that, when receiving data of a URI format, the underlying application directly transmits the received data to the system browser) when the URI is detected by the underlying application. When receiving the URI, the system browser of the application layer adds a download address that is in the URI to a download queue, and invokes a download thread to implement the data download.

In the computing device provided in this embodiment, a dedicated API download interface does not need to be configured for an application. During data download, a uniform resource identifier (URI) is directly generated based on a download address that is in the download task, and a unified system standard access interface is invoked to transmit the URI to a system browser. The system browser adds the download address that is in the received URI to a download queue. In this way, the data download is implemented without integrating a SDK for the application, thereby reducing development costs.

Further, another embodiment of the computing device according to this application is provided based on the foregoing embodiment. In this embodiment, a user may implement an operation such as suspension, deletion, or restart on a download task by changing a flag in a sent URI. That is, while the download task is obtained, a download task identifier and a download address are stored. The computing device further includes:

a first storage module, configured to store the download task and the download address in an associated manner when the obtaining module obtains the download task; and a first receiving module, configured to receive a download task processing instruction that is triggered based on the stored download task.

The obtaining module 10 is further configured to: when the first receiving module receives a download task processing instruction that is triggered based on the stored download task, obtain identifier information that corresponds to the download task processing instruction, the download task processing instruction including a task suspension instruction, a task deletion instruction, and a task restart instruction.

The generating module 20 is further configured to generate a uniform resource identifier (URI) based on the download address that is in the download task, and the identifier information.

The transmission module 30 is further configured to invoke the system standard access interface to transmit the URI to the system browser, wherein the system browser is configured to process the download task that is in the download queue according to the download address that is in the URI, and the identifier information.

The download task identifier may be a keyword of the download data, or may be named by the user. That is, when a data download instruction is received, a download identifier input interface is displayed for entering the download identifier by the user. When the user clicks a control that is of a current download task and that is on an application interface, an interface of the current download task can be displayed. A download task identifier corresponding to each download task is displayed on the interface. The download task identifiers are ranked in a sequence of generation time. After clicking a download task identifier, the user needs to select a processing type (such as deletion, suspension or restart). In this way, a download task processing instruction can be triggered. It may be understood that suspension and restart can be implemented by directly clicking the download task identifier. For example, if a download task corresponding to the task identifier that is clicked by the user is currently in a suspension state, a restart instruction of the download task is triggered. If the download task corresponding to the task identifier that is clicked by the user is currently in a normal download state, a suspension instruction of the download task is triggered. Different identifier information may be set for different processing instructions for ease of recognition by a browser. For example, identifier information corresponding to a suspension task is 1, identifier information corresponding to a deletion task is 2, and identifier information corresponding to a restart task is 3.

It may be understood that a task identifier and a URI may be stored in an associated manner. When a download task processing instruction is received, a flag in the URI is changed. That is, the computing device further includes: a second storage module, a second receiving module, and an adjustment module.

The second storage module is configured to store the URI and the download task in an associated manner after the uniform resource identifier (URI) is generated by the generating module.

The second receiving module is configured to receive a download task processing instruction.

The obtaining module 10 is further configured to: when the second receiving module receives a download task processing instruction, obtain identifier information that corresponds to the download task processing instruction, the download task processing instruction including a task suspension instruction, a task deletion instruction, and a task restart instruction.

The adjustment module is configured to change identifier information of a flag in the URI that is associated with the download task to the obtained identifier information.

The transmission module 30 is further configured to invoke the preset system standard data access interface to transmit the URI whose processing status flag is changed to the system browser, the system browser processing the download task that is in the download queue according to the download address and the flag that are in the URI.

In this solution, a URI does not need to be repeatedly generated, and only a flag in the URI needs to be changed, so that operation of this solution is more convenient.

Further, another embodiment of the computing device according to this application is provided based on the foregoing content. In this embodiment, the computing device further includes:

a third receiving module, configured to: after the transmission module transmits the URI to the system browser, receive response information that is returned by the system browser by using the standard data access interface; and an updating module, configured to change a download state of the download task according to the response information.

After the URI is transmitted to a system underlying application by using the standard data access interface, the underlying application feeds back response information. When the response information returned by the underlying application is detected, a download state of the download task is changed. The download state includes: a download state, a suspension state, a restart state, and a deletion state.

It may be understood that for ease of checking download progress by a user, when a download progress interface of the system browser pops up on the system, the download progress interface may be set above an application interface. That is, the computing device further includes a display module that is configured to display the download progress interface of the system browser, so that the user can learn about a task download status in time.

Figure 4:
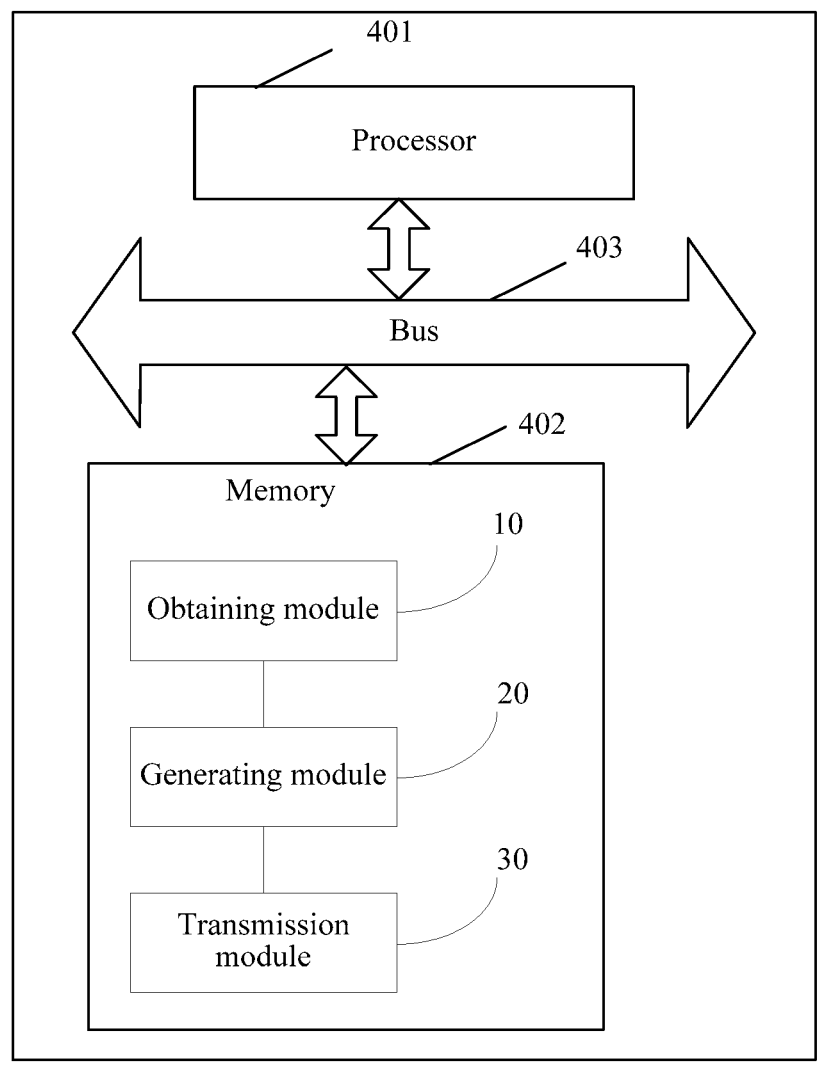
FIG. 4 is a schematic composition diagram of a hardware architecture of a computing device according to another embodiment of this application.

FIG. 4 is a schematic composition diagram of a hardware architecture of a computing device according to another embodiment of this application. The apparatus may include: a processor 401, a memory 402, and a bus 403. The processor 401 is interconnected to the memory 402 by using the bus 403.

An obtaining module 10, a generating module 20 and a transmission module 30 are stored in the memory 402. A first storage module, a first receiving module, a second storage module, a second receiving module, an adjustment module, a third receiving module, an updating module and a display module (not shown in the figure) may further be stored in the memory 402.

When executed by the processor 401, operations performed by the modules stored in the memory 402 are the same as the operations in the foregoing embodiments, and details are not described herein again.

An embodiment of this application further provides a non-transitory computer readable storage medium, which stores one or more computer executable instructions. The computer readable storage medium is, for example, a non-volatile memory such as an optical disk, a hard disk, or a flash memory. The computer executable instruction is used by a computer or a similar arithmetic operation apparatus to complete the various operations in the foregoing data download method.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Unless otherwise specified, an element limited by "include a/an . . . " does not exclude other same elements existing in the process, the method, the article, or the apparatus that includes the element.

The sequence numbers of the embodiments of this application are merely for the convenience of description, and do not imply the preference among the embodiments.

Through the foregoing description of the implementations, it may be clearly understood by a person skilled in the art that the foregoing method in the embodiments may be implemented by software plus a necessary universal hardware platform, and certainly may also be implemented by hardware. In many cases, the software implementation is preferred. Based on such an understanding, the technical solutions of this application essentially, or the part contributing to the existing technology may be implemented in a form of a software product. The computer software product is stored in a non-transitory computer readable storage medium (for example, a ROM/RAM, a magnetic disk, or an optical disc), and includes several instructions for instructing a terminal device (which may be a mobile phone, a computer, a server, or a network device) to perform the method according to the embodiments of this application.

What is claimed is:

1. A data download method performed at a computing device having one or more processors and memory storing one or more programs to be executed by the one or more processors, the method comprising:
    obtaining a download task from a user of the computing device;
    storing a download task identifier and a download address associated with the download task;
    receiving a download task processing instruction that is triggered based on the stored download task identifier;
    obtaining identifier information that corresponds to the download task processing instruction, the download task processing instruction comprising a task suspension instruction, a task deletion instruction, and a task restart instruction;
    generating a uniform resource identifier (URI) based on a download address that is in the download task and associated with the identifier information; and
    invoking a system standard access interface to transmit the URI to a system browser, wherein the system browser is configured to add the download address that is in the received URI to a data download queue and process the download task that is in the download queue according to the download address that is in the URI, and the identifier information.

2. The data download method according to claim 1, further comprising:
    after generating a uniform resource identifier (URI) based on a download address that is in the download task, storing the URI and a download task identifier associated with the URI;
    receiving a download task processing instruction;
    obtaining identifier information that corresponds to the download task processing instruction, the download task processing instruction comprising a task suspension instruction, a task deletion instruction, and a task restart instruction;
    changing identifier information of a flag in the URI that is associated with the download task identifier to the obtained identifier information; and
    invoking the preset system standard data access interface to transmit the URI whose processing status flag is changed to the system browser, the system browser processing the download task that is in the download queue according to the download address and the flag that are in the URI.

3. The data download method according to claim 1, further comprising:
    receiving response information that is returned by the system browser by using the standard data access interface; and
    changing a download state of the download task according to the response information.

4. The data download method according to claim 3, further comprising:
    displaying a download progress interface of the system browser.

5. The data download method according to claim 1, wherein the computing device runs on Android system and the system standard access interface is provided by the Android system and supported by Android browser.

6. The data download method according to claim 5, wherein the method is performed by a third-party application running on the computing device.

7. A computing device, comprising:
    at least one processor;
    memory; and
    one or more program instructions stored in the memory that, when executed by the at least processor, cause the computing device to perform a plurality of operations including:
        obtaining a download task from a user of the computing device;
        storing a download task identifier and a download address associated with the download task;
        receiving a download task processing instruction that is triggered based on the stored download task identifier;
        obtaining identifier information that corresponds to the download task processing instruction, the download task processing instruction comprising a task suspension instruction, a task deletion instruction, and a task restart instruction;
        generating a uniform resource identifier (URI) based on a download address that is in the download task and associated with the identifier information; and
        invoking a system standard access interface to transmit the URI to a system browser, wherein the system browser is configured to add the download address that is in the received URI to a data download queue and process the download task that is in the download queue according to the download address that is in the URI, and the identifier information.

8. The computing device according to claim 7, wherein the plurality of operations further comprise:
    after generating a uniform resource identifier (URI) based on a download address that is in the download task, storing the URI and a download task identifier associated with the URI;
    receiving a download task processing instruction;
    obtaining identifier information that corresponds to the download task processing instruction, the download task processing instruction comprising a task suspension instruction, a task deletion instruction, and a task restart instruction;

changing identifier information of a flag in the URI that is associated with the download task identifier to the obtained identifier information; and invoking the preset system standard data access interface to transmit the URI whose processing status flag is changed to the system browser, the system browser processing the download task that is in the download queue according to the download address and the flag that are in the URI.

9. The computing device according to claim 7, wherein the plurality of operations further comprise:

receiving response information that is returned by the system browser by using the standard data access interface; and changing a download state of the download task according to the response information.

10. The computing device according to claim 9, wherein the plurality of operations further comprise:

displaying a download progress interface of the system browser.

11. The computing device according to claim 7, wherein the plurality of operations further comprise, wherein the computing device runs on Android system and the system standard access interface is provided by the Android system and supported by Android browser.

12. A non-transitory computer readable storage medium storing a plurality of program instructions that, when executed by one or more processors of a computing device, cause the computing device to perform a plurality of operations including:

obtaining a download task from a user of the computing device;

storing a download task identifier and a download address associated with the download task;

receiving a download task processing instruction that is triggered based on the stored download task identifier;

obtaining identifier information that corresponds to the download task processing instruction, the download task processing instruction comprising a task suspension instruction, a task deletion instruction, and a task restart instruction;

generating a uniform resource identifier (URI) based on a download address that is in the download task and associated with the identifier information; and invoking a system standard access interface to transmit the URI to a system browser, wherein the system browser is configured to add the download address that is in the received URI to a data download queue and process the download task that is in the download queue according to the download address that is in the URI, and the identifier information.

13. The non-transitory computer readable storage medium according to claim 12, wherein the plurality of operations further comprise:

after generating a uniform resource identifier (URI) based on a download address that is in the download task, storing the URI and a download task identifier associated with the URI;

receiving a download task processing instruction;

obtaining identifier information that corresponds to the download task processing instruction, the download task processing instruction comprising a task suspension instruction, a task deletion instruction, and a task restart instruction;

changing identifier information of a flag in the URI that is associated with the download task identifier to the obtained identifier information; and invoking the preset system standard data access interface to transmit the URI whose processing status flag is changed to the system browser, the system browser processing the download task that is in the download queue according to the download address and the flag that are in the URI.

14. The non-transitory computer readable storage medium according to claim 12, wherein the plurality of operations further comprise:

receiving response information that is returned by the system browser by using the standard data access interface; and changing a download state of the download task according to the response information.

15. The non-transitory computer readable storage medium according to claim 14, wherein the plurality of operations further comprise:

displaying a download progress interface of the system browser.

16. The non-transitory computer readable storage medium according to claim 12, wherein the plurality of operations further comprise, wherein the computing device runs on Android system and the system standard access interface is provided by the Android system and supported by Android browser.

* * * * *